(12) United States Patent
Meldahl et al.

(10) Patent No.: US 8,400,871 B2
(45) Date of Patent: Mar. 19, 2013

(54) SEAFLOOR-FOLLOWING STREAMER

(75) Inventors: Paul Meldahl, Forus (NO); Kjell Vie, Stavanger (NO); Jan Adland, Paradis (NO)

(73) Assignee: Statoil ASA, Stavanger (NO)

( * ) Notice: Subject to any disclaimer, the term of this patent is extended or adjusted under 35 U.S.C. 154(b) by 626 days.

(21) Appl. No.: 12/514,963

(22) PCT Filed: Nov. 14, 2007

(86) PCT No.: PCT/GB2007/004348
§ 371 (c)(1),
(2), (4) Date: Feb. 1, 2010

(87) PCT Pub. No.: WO2008/059243
PCT Pub. Date: May 22, 2008

(65) Prior Publication Data
US 2010/0128561 A1    May 27, 2010

(30) Foreign Application Priority Data
Nov. 14, 2006 (GB) .................................. 0622697.1

(51) Int. Cl.
*G01V 1/38* (2006.01)
(52) U.S. Cl. .......................................................... 367/16
(58) Field of Classification Search ............... 367/16
See application file for complete search history.

(56) References Cited

U.S. PATENT DOCUMENTS

| | | |
|---|---|---|
| 3,275,097 A | 9/1966 | Pavey, Jr. |
| 3,590,919 A | 7/1971 | Talley, Jr. |
| 4,378,848 A | 4/1983 | Milberger |
| 4,576,479 A | 3/1986 | Downs |
| 4,583,095 A | 4/1986 | Peterson |
| 4,843,597 A | 6/1989 | Gjessing et al. |
| 4,862,422 A | 8/1989 | Brac |
| 4,909,671 A * | 3/1990 | Skjong .......................... 405/206 |
| 4,942,557 A | 7/1990 | Seriff |
| 4,970,699 A | 11/1990 | Bucker et al. |
| 4,992,995 A | 2/1991 | Favret |
| 5,029,023 A | 7/1991 | Bearden et al. |
| 5,070,483 A | 12/1991 | Berni |

(Continued)

FOREIGN PATENT DOCUMENTS

| | | |
|---|---|---|
| DE | 4004228 | 8/1991 |
| EP | 0018053 | 4/1980 |

(Continued)

OTHER PUBLICATIONS

International Preliminary Report on Patentability for PCT/GB2007/004348. WIPO document. 5 pages. May 19, 2009.*

(Continued)

*Primary Examiner* — Isam Alsomiri
*Assistant Examiner* — James Hulka
(74) *Attorney, Agent, or Firm* — Patterson Thuente Pedersen, P.A.

(57) ABSTRACT

Seismic exploration techniques and the seismic imaging of subsurface layers, particularly apparatus for seismic exploration near the seafloor, are disclosed. The apparatus enables controlled-depth towing of detectors to be carried out a short distance above the seafloor. The apparatus includes a streamer depth controller and at least one altitude keeper device, attached at intervals along the length of a towed streamer. The streamer carries detectors for measuring, for example, P- and S-waves in the seafloor.

22 Claims, 3 Drawing Sheets

U.S. PATENT DOCUMENTS

| | | | |
|---|---|---|---|
| 5,109,362 A | 4/1992 | Berni | |
| 5,144,588 A | 9/1992 | Johnston et al. | |
| 5,159,406 A | 10/1992 | Adler et al. | |
| 5,317,383 A | 5/1994 | Berni | |
| 5,444,619 A | 8/1995 | Hoskins | |
| 5,477,324 A | 12/1995 | Berthelot et al. | |
| 5,570,321 A | 10/1996 | Bernitsas | |
| 5,671,136 A | 9/1997 | Willhoit, Jr. | |
| 5,724,309 A | 3/1998 | Higgs | |
| 5,892,732 A | 4/1999 | Gersztenkorn et al. | |
| 5,940,777 A | 8/1999 | Keskes | |
| 5,987,388 A | 11/1999 | Crawford et al. | |
| 6,011,557 A | 1/2000 | Keskes et al. | |
| 6,011,753 A | 1/2000 | Chien | |
| 6,026,057 A | 2/2000 | Byun et al. | |
| 6,028,817 A | 2/2000 | Ambs | |
| 6,049,760 A | 4/2000 | Scott | |
| 6,081,481 A | 6/2000 | Sabatier et al. | |
| 6,134,966 A | 10/2000 | Donskoy et al. | |
| 6,141,440 A | 10/2000 | Melen | |
| 6,182,015 B1 | 1/2001 | Altan et al. | |
| 6,301,193 B1 | 10/2001 | Martin et al. | |
| 6,456,565 B1 | 9/2002 | Grall et al. | |
| 6,473,695 B1 | 10/2002 | Chutov et al. | |
| 6,536,528 B1 | 3/2003 | Amin et al. | |
| 6,672,391 B2 | 1/2004 | Anderson et al. | |
| 6,725,163 B1 | 4/2004 | Trappe et al. | |
| 6,735,526 B1 | 5/2004 | Meldahl et al. | |
| 6,752,214 B2 | 6/2004 | Amin et al. | |
| 6,772,840 B2 | 8/2004 | Headworth | |
| 6,788,618 B2 | 9/2004 | Clayton et al. | |
| 6,873,571 B2 | 3/2005 | Clayton et al. | |
| 7,011,152 B2 | 3/2006 | Soelvik | |
| 7,032,658 B2 | 4/2006 | Chitwood et al. | |
| 7,137,451 B2 | 11/2006 | Smith | |
| 7,261,162 B2 | 8/2007 | Deans et al. | |
| 7,311,151 B2 | 12/2007 | Chitwood et al. | |
| 7,383,133 B1 | 6/2008 | Scott | |
| 7,463,549 B2 | 12/2008 | Naess | |
| 7,530,398 B2 | 5/2009 | Balkanyi et al. | |
| 7,615,893 B2 | 11/2009 | Biester et al. | |
| 7,660,188 B2 | 2/2010 | Meldahl | |
| 7,703,535 B2 | 4/2010 | Benson | |
| 7,720,609 B2 | 5/2010 | Meldahl | |
| 7,721,807 B2 | 5/2010 | Stoisits et al. | |
| 7,793,724 B2 | 9/2010 | Daniel et al. | |
| 7,918,283 B2 | 4/2011 | Balkanyi et al. | |
| 7,933,003 B2 | 4/2011 | Meldahl et al. | |
| 7,958,938 B2 | 6/2011 | Crossley et al. | |
| 7,992,632 B2 | 8/2011 | Borrnes et al. | |
| 8,033,336 B2 | 10/2011 | Benson | |
| 8,089,390 B2 | 1/2012 | Jones et al. | |
| 8,115,491 B2 * | 2/2012 | Alumbaugh et al. | 324/365 |
| 2002/0126575 A1 * | 9/2002 | Bittleston | 367/19 |
| 2003/0060102 A1 | 3/2003 | Ambs | |
| 2004/0015296 A1 | 1/2004 | Causse et al. | |
| 2004/0022125 A1 | 2/2004 | Clayton et al. | |
| 2004/0144543 A1 | 7/2004 | Appleford et al. | |
| 2004/0228214 A1 | 11/2004 | Tulett | |
| 2005/0178556 A1 | 8/2005 | Appleford et al. | |
| 2005/0209783 A1 * | 9/2005 | Bittleston | 702/14 |
| 2005/0288862 A1 | 12/2005 | Rode et al. | |
| 2006/0098529 A1 | 5/2006 | Anderson et al. | |
| 2006/0285437 A1 | 12/2006 | Sinha et al. | |
| 2007/0075708 A1 | 4/2007 | Reddig et al. | |
| 2008/0288173 A1 | 11/2008 | Saenger | |
| 2009/0128800 A1 | 5/2009 | Meldahl et al. | |
| 2009/0204330 A1 | 8/2009 | Thomsen et al. | |
| 2010/0133901 A1 | 6/2010 | Zhang et al. | |
| 2010/0252260 A1 | 10/2010 | Fowler et al. | |
| 2010/0332139 A1 | 12/2010 | Bruun et al. | |
| 2011/0046885 A1 | 2/2011 | Bussat et al. | |
| 2011/0085420 A1 | 4/2011 | Bussat et al. | |
| 2011/0242935 A1 | 10/2011 | Amundsen et al. | |
| 2011/0290497 A1 | 12/2011 | Stenevik | |

FOREIGN PATENT DOCUMENTS

| | | |
|---|---|---|
| EP | 1403662 | 9/2003 |
| EP | 1879052 | 1/2008 |
| FR | 2765344 | 12/1998 |
| GB | 2 001 021 A | 1/1979 |
| GB | 2 331 971 A | 6/1999 |
| GB | 2331971 | 11/1999 |
| GB | 2 342 081 A | 4/2000 |
| GB | 2347744 | 9/2000 |
| GB | 2 364 388 A | 1/2002 |
| GB | 2410635 | 8/2005 |
| GB | 2416835 | 8/2006 |
| GB | 2454745 | 5/2009 |
| JP | 2005275540 | 10/2005 |
| RU | 2072534 | 1/1997 |
| RU | 2121133 | 10/1998 |
| RU | 2246122 | 2/2005 |
| SU | 9533 | 1/1900 |
| SU | 1728825 | 4/1992 |
| WO | WO 91/13373 | 9/1991 |
| WO | WO 96/18116 | 6/1996 |
| WO | WO 97/33184 | 9/1997 |
| WO | WO 00/16125 | 3/2000 |
| WO | WO 01/61380 | 8/2001 |
| WO | WO 01/90782 | 11/2001 |
| WO | WO 02/27355 | 4/2002 |
| WO | WO 02/073241 | 9/2002 |
| WO | WO 2004/003589 A1 | 1/2004 |
| WO | WO 2004/044617 | 5/2004 |
| WO | WO 2005/078479 | 8/2005 |
| WO | WO 2006/011826 | 2/2006 |
| WO | WO 2007/141725 | 12/2007 |
| WO | WO2009151930 | 12/2009 |

OTHER PUBLICATIONS

Artman, Brad, "Imaging passive seismic data," *Geophysics*, vol. 71, No. 4, pp. SI177-SI187, SP-002479903 (Jul.-Aug. 2006).

Berni, "Remote sensing of seismic vibrations by laser Doppler interferometry" Geophysics. vol. 59, No. 12. pp. 1856-1867. Dec. 1994.

Castagna, John P., et al., "Instantaneous spectral analysis: Detection of frequency shadows associated with hydrocarbons," *The Leading Edge*, XP-002461160, pp. 120-127 (Feb. 2003).

Daneshvar, M. Reza, et al., "Passive seismic imaging using microearthquakes," *Geophysics*, vol. 60, No. 4, pp. 1178-1186 (Jul.-Aug. 1995).

Hohl, Detlef, et al., "Passive Seismic Reflectivity Imaging with Ocean-Bottom Cable Data," *SEG/New Orleans 2006 Annual Meeting*, XP-002-156524343, pp. 1560 (2006).

Meldahl et al., Identifying Faults and Gas Chimneyts Using Multiattributes and Neural Networks, May 2001. The Leading Edge, pp. 474-482.

Wood et al., "Decreased Stability of Methane Hydrates in Marine Sediments Owing to Phase-Boundry Roughness" Dec. 12, 2002. Nature, vol. 420. pp. 656-660.

International Search Report—PCT/GB2005/000075 dated Mar. 2, 2006 and GB 0500484.1 dated Apr. 12, 2006.

International Search Report—PCT/GB2008/004243 dated May 7, 2009.

International Search Report—PCT/GB2006/003000 dated Dec. 29, 2006 and Search Report for GB 0516720.0 dated Nov. 8, 2006.

International Search Report—PCT/GB99/03039 dated Jan. 12, 2000.

Preliminary Examination Report—PCT/GB99/03039 dated Oct. 10, 2000.

International Search Report—PCT/GB2008/051223 dated Apr. 29, 2010.

Application and File History of U.S. Appl. No. 61/321,670, filed Apr. 7, 2010. Inventors Amundsen.

Application and File History of U.S. Appl. No. 12/743,338, filed May 17, 2010. Inventors Torstein.

Application and File History of U.S. Appl. No. 12/789,570, filed May 28, 2010. Inventors Stenevik.

Application and File History of U.S. Appl. No. 12/809,335, filed Jun. 18, 2010. Inventors Bussat.
Application and File History of U.S. Appl. No. 12/809,467, filed Jun. 18, 2010. Inventors Bussat.
Russian Office Action for Russian Application No. 2009122380/28030897 dated Jul. 11, 2011.
Application and File History for U.S. Appl. No. 13/078,628, filed Apr. 1, 2011, inventor Amundsen.
Bensen et al., Processing Seismic Ambient Noise Data to Obtain reliable Broad-band surface wave dispersion measurements, Jul. 28, 2006 2007. 1239-1260.

Great Britain Search Report for GB Application No. GB1005574.7 dated Jul. 20, 2010.
Invitation to Pay Additional Fees and Partial International Search Report for International Application No. PCT/EP2011/055140 dated May 30, 2012.
Invitation to pay Additional Fees and Partial ISR from International Application No. PCT/EP2011/055140 dated May 30, 2012.
GB Search Report from GB Application No. 1005574.7 dated Jul. 20, 2010.

* cited by examiner

SEAFLOOR-FOLLOWING STREAMER

PRIORITY CLAIM

The present application is a National Phase entry of PCT Application No. PCT/GB2007/004348, filed Nov. 14, 2007, which claims priority from Great Britain Application Number 0622697.1, filed Nov. 14, 2006, the disclosures of which are hereby incorporated by reference herein in their entirety.

FIELD OF THE INVENTION

The invention relates to seismic exploration techniques and the seismic imaging of subsurface layers. It is particularly but not exclusively concerned with apparatus for submarine seismic exploration.

BACKGROUND

Conventional seismic methods for exploring subterranean strata beneath the seabed involve generating a seismic wave and measuring the response from the subsurface. The seismic wave may be simple or complex and may be generated at sea level, beneath the surface of the water or at the seabed. The response is detected by a series of spaced receivers which may be positioned on cables or "streamers" towed just beneath the sea-surface behind an exploration vessel or may be located on the seafloor. In the case of the receivers which are held stationary on the seafloor, after the detection step, they may have to be moved to a different location for the process to be repeated, or they are recovered if the survey is complete.

The response to a seismic event in the solid rock at the sea floor includes a compression wave (P-wave) and shear waves (S-waves). P-waves are considered well suited to imaging structures while the combination of S-waves is well suited to determining rock and fluid characteristics. P-waves travel through rock and sea water while S-waves travel through rock only. Thus, if the receivers are hydrophones located at or beneath the surface, they will detect only the P-waves. In order to detect the S-waves, it has been necessary to use a geophone located at the seabed.

It has been recognised that better seismic imaging can be achieved by making use of both P- and S-waves in so-called 4C seismic imaging, in which 4C stands for "four component", one component being due to the P-wave and three to the S-wave. In order to detect S-waves effectively, three independent orthogonal and stationary geophones are required at each recording location. However, it has recently become possible to use a detecting apparatus located at a short distance from the seabed, which monitors the movements of particles at the earth's surface thus detecting both P-waves and S-waves, such as the detecting apparatus described in WO 2004/003589.

WO 2004/003589 discloses instruments named Ocean Bottom Movie Recorders (OBMs), which detect P-waves and S-waves while located a short distance from the seabed, by measuring the response of particles on the seabed to seismic events.

4C seismic imaging of the subsurface can add more and better information to exploration due to high quality recording of S-waves at the water bottom. Unfortunately, 4C-imaging has suffered from a combination of extremely high acquisition cost, variable payback and uncertainties in prediction of payback. This is partly because positioning and re-positioning geophones on the sea bed has been found to be very costly and limited in accuracy.

It has been recognised by the inventors that the effectiveness of carrying out such seismic imaging could be greatly increased if a method allowing continual controlled motion of suitable P- and S-wave receivers relative to the seabed was available. However, remote sensing at a distance above the seafloor has inherent problems in that the detection apparatus is subject to ocean currents which can inhibit effective positioning of the detection apparatus, and introduce noise into measurements, making correlation of the results very difficult.

Currently known streamers are designed to be towed just beneath the sea-surface and are steerable laterally. In some systems, streamer depth is controllable, and the depth may be up to a few metres below sea level. Such systems are not suitable for use near the seafloor in deep waters, and can not easily be deployed at such locations.

SUMMARY

Embodiments provide an apparatus for submarine exploration which avoids the need to pick up, move and re-position detectors accurately on the seafloor, by enabling controlled-depth towing of detectors to be carried out a short distance above the seafloor.

A system is provided which comprises a survey vessel; at least one streamer; the streamer being arranged to be towed by the vessel; the streamer having associated with it detecting apparatus, a depth controller, at least one altitude keeper and a steering system; the depth controller and the at least one altitude keeper being arranged to maintain the streamer in a position near the seafloor as it is towed by the vessel; the detecting apparatus being arranged to detect and record data while the streamer is in motion relative to the seafloor as it is towed by the vessel.

Embodiments also provide a method of conducting underwater surveys, the method comprising towing at least one streamer behind a survey vessel, the streamer having associated with it detecting apparatus, a depth controller, an altitude keeper and a steering control system; maintaining the streamer at a position near the seafloor using the depth controller and the altitude keeper, as the streamer is towed by the vessel; controlling the direction of motion of the streamer using the steering control system; and detecting and recording data using the detecting apparatus while the streamer is in motion relative to the seafloor as it is towed by the vessel. Embodiments of the method can include the generation of a seismic event using a marine seismic source. The type of source used and the way in which it is used will depend on the geography of the survey region and the type of survey being carried out.

BRIEF DESCRIPTION OF THE DRAWINGS

The invention may be put into practice in a number of ways, and one embodiment will now be described by way of example, with reference to the accompanying drawings, in which.

DETAILED DESCRIPTION

Figure 1:
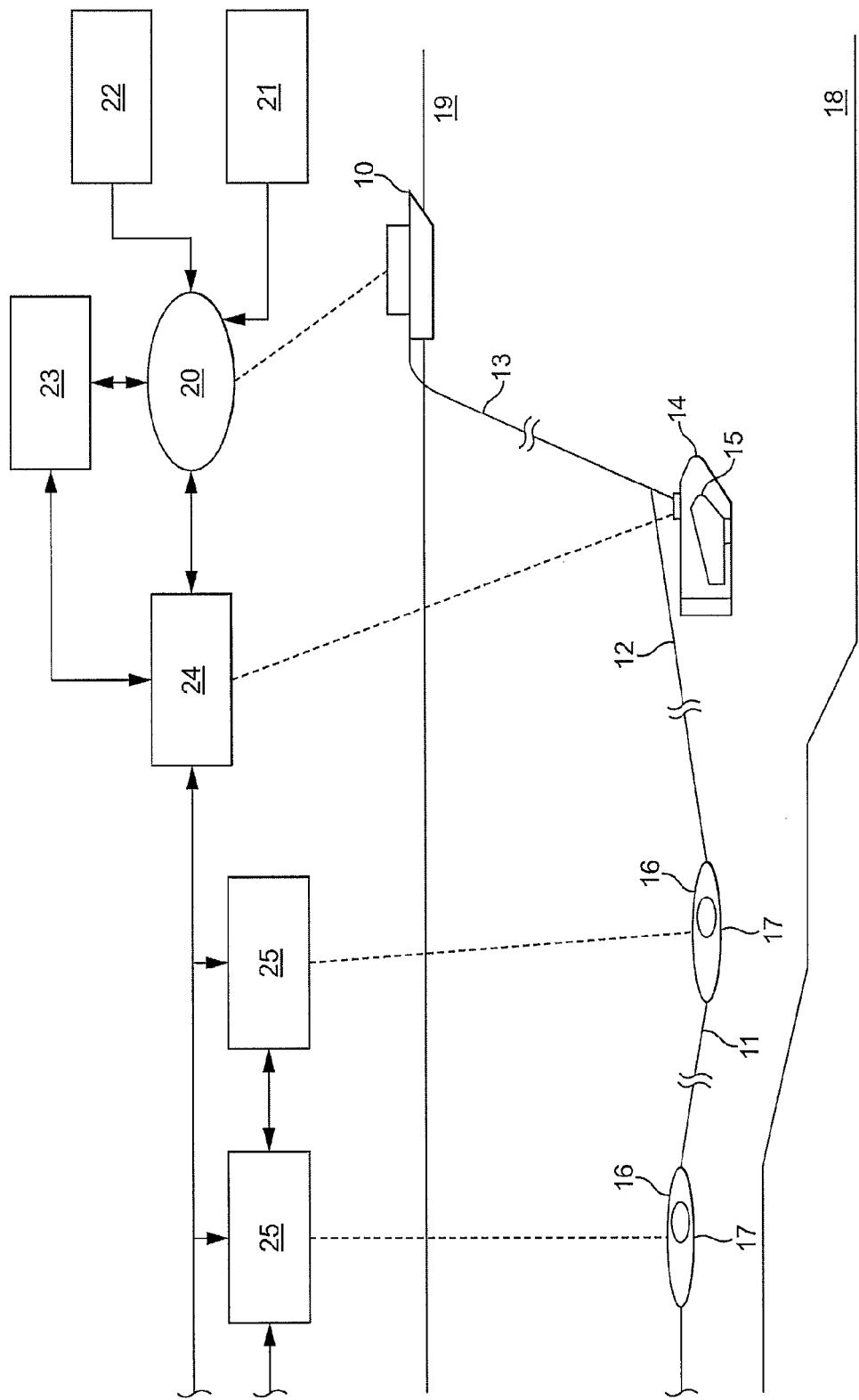
FIG. 1 is a diagram of a survey system in accordance with the present invention.

Embodiments make it possible to measure small movements and seismic waves, including both P- and S-waves, in the sea floor while the instrument is moving through the water above the seafloor.

Enabling the use of streamers rather than stationary seafloor detectors means that relatively large sea floor areas can be measured and investigated in a relatively short time, and in a more cost-effective manner.

Embodiments are particularly applicable to seismic exploration, but may be applied to any type of survey which may derive benefit from the provision of such controlled towing of survey instruments. For example, a survey which locates potential mines, foreign objects near the seafloor or pollutants, may benefit from such apparatus.

In embodiments, the streamer is a towed streamer adapted to function under high pressure. The detecting apparatus may include instruments for detecting P- and S-waves, for example, hydrophones to detect P-waves in the water, and detecting apparatus of the type described in WO 2004/003589 to detect P- and S-waves at the seafloor (OBMs). The number and position of the instruments depend on the survey to be carried out. The detecting apparatus may comprise means for compensating for its own motion while it is detecting and recording data.

The streamer may have short, for example 50 m long, non-rotating sections situated immediately before, after or in-between consecutive items of equipment attached to the streamer, such as instruments and altitude keepers. The non-rotating sections may be provided with longitudinal fins to help to prevent rotation of the streamer. The cable skin itself should be wound such that drag variations do not result in rotation. The streamer may also include Vibration Isolation Modules (VIMs) to reduce data noise.

Embodiments of the system allow streamers to be deployed at depths of up to a few thousand metres below sea level, and for the depth of the streamers to be controlled. A multiplicity of streamers may be towed in one array. The length of each streamer may be between 3000 and 8000 m, for example 5000m. The streamer tow-pattern is dictated by the nature of the survey to be undertaken, and can also be adapted to take bathymetric data for the survey area into account.

The survey vessel can be equipped with at least one tow-winch and overboard sheave system for lowering, towing and raising the bottom-following streamer(s). The conditions in the area to be surveyed will affect the optimum length, width, number of instruments associated with and surveying depth of the streamer array, which will in turn determine the nature and number of items of towing equipment required.

The vessel can be preferably provided with a GPS and a hydroacoustic positioning device, which can be multi-beam.

Each streamer is provided with certain pieces of equipment. The depth of the front end of the streamer is controlled by a depth controller, which can be a multi-hull maneuverable depressor, which in operation has an optimal position of 50 to 100 m above the seafloor, depending on the terrain. The depth controller may optionally be a single-hull depressor, depending on the instrument requirements and survey considerations.

Each streamer can be attached via a cable to a separate maneuverable depth controller, which allows independent control of the depth of each streamer. The depth controller is actively controlled, and may have both vertical and horizontal maneuverability. Alternatively or additionally, there may be additional separate items of equipment which affect the horizontal motion of the streamer in use, such as paravane-type equipment.

The depth controller may be equipped with control surfaces including adjustable wings, balance-rudder and heading-rudder. It can also be provided with a depth sensor, an altimeter, a fibre optic gyro/attitude system and hydroacoustic positioning transponders and/or alternative position and/or speed monitoring devices such as cameras. There is also a depth controller control system, which can communicate with the main control system, and a depth controller power distribution unit to activate the control surfaces of the depth controller when required.

The main purposes of the depth controller are to lower the streamer as close to the seafloor as appropriate for a safe survey taking into account the surrounding terrain, and to allow horizontal steering of the streamer. The depth controller can also be controlled actively to maintain a slow ascent or decent, which may be combined with raising or lowering via the tow-winch, to allow a safe survey to be performed in directions towards or away from the mainland. Further, the altimeter in the depth controller provides part of the input to determine a safe height for the streamer altitude keepers. In this role the depth controller altimeter acts as an early warning device and helps to prevent unnecessary dives and climbs.

The streamer may also be provided with ballast to assist with the lowering of the subsea section of the system, and a ballast release system which may be acoustically activated, to allow recovery of the subsea system in an emergency.

The streamer can also be provided with one or more altitude keeper devices, attached at intervals along the streamer. The interval between each pair of successive altitude keepers may be between 200 and 500 m, for example, 250 m.

The altitude keepers can be in the form of winged towfish, which may be either single- or multi-hulled. The altitude keepers are more finely controllable than the depth controller, and may be used to reduce any rotation of the streamer as well as maintaining the streamer at a distance of between 2 and 50 m above the seafloor during surveys, such as between 5 and 30 m or between 5 and 20 m above the seafloor. The use of certain instruments, such as those for detecting P- and S-waves as previously referred to, requires the streamer to be positioned as close as possible to the seafloor without risking damage to the instruments.

The minimum number and the optimum number of altitude keepers required per streamer depend on the length of the streamer, sea currents and other operational conditions. Each altitude keeper can be provided with a hydro acoustic positioning device and/or alternative position and/or speed monitoring devices such as cameras, as well as an altitude keeper control system, which can communicate with the depth controller control system and the main control system directly or via the depth controller control system. Each altitude keeper is also provided with a control system to activate the control surfaces of the altitude keeper when required. Each altitude keeper has a number of associated instruments which provide data to the control system, and which may also log data within the altitude keeper, the instruments measuring data including bathymetry data and Doppler velocity log data.

In addition, any of the items of equipment relating to the streamer, including for example altitude keepers and the detecting apparatus, may also carry auxiliary instrumentation, in order to record data relating to any of the following variables: water pressure, temperature, depth, salt concentration, water current motion, streamer vibration, survey instrument vibration, sea floor reflectivity (using white light or laser light for example), geometry of towing profile, etc.

The control system can comprise a main control system, and a number of sub-systems. A multiplexer may be used to handle all communication between the subsea section of the system and the surface based control systems. The main control system receives inputs from the vessel's GPS and echo sounder, the depth controller(s) hydroacoustic positioning instruments, and bathymetric and speed data from the subsea devices. The main control system outputs instructions to the winch control system and all control systems for subsea devices, to control the attitude and depth of the streamer(s) before, during and after surveys and to prevent collisions between the streamer and the seafloor.

The winch control system is controlled by the main control system but additionally can be manually overridden in the event of an emergency.

The depth controller control system can input data from the location sensors on the depth controller to the main control system. On the basis of this data and other information, the main control system can then communicate with the depth controller control system, which outputs instructions to the depth controller control surfaces to maintain the depth controller in a level plane and optimise depth control.

Control of the depth controller wings can be linked to the winch control in such a manner that if a quick ascent is required, the winch is instructed to heave at maximum speed and at the same time the depth controller control surfaces are turned into a position where the depression force is minimised for a speedy ascent. The depth controller may also contain ballast which can be released if a fast ascent is needed in an emergency.

Each altitude keeper control system can be instructed to maintain the altitude of the altitude keeper as appropriate to the surrounding terrain and any tow path obstacles. Based on topography below the depth controller, the main control system may output instructions to the altitude keeper control systems via the depth controller control system to help to prevent the streamer colliding with the seafloor.

FIG. 1 shows a survey system in accordance with an embodiment. The survey system comprises a survey vessel 10 at sea level 19, which tows one streamer 11, via a cable 12 attached to a tow line 13. Tow line 13 may be equipped with one or more flow modifying devices (not shown) which may be spaced evenly apart along the tow line, which act to suppress vibration of the tow-line caused by turbulence during towing. The devices may be in the form of wedge shaped plates attached to the tow-line. Such devices may help to reduce noise in the survey, by reducing vibrations in the system attached to the tow-line.

The streamer 11 has seismic detecting apparatus (not shown) associated with it. The depth of the streamer 11 is controlled by a multihull depressor 14 and altitude keeper devices 16 which are located along the length of the streamer 11. The distance between the multihull depressor 14 and the altitude keeper device furthest from the multihull depressor 14 is approximately 5000 m. The altitude keeper devices 16 are located every 500 m along the length of the streamer 11. The cable 12 is approximately 250 m in length and the tow line 13 is approximately 150 m in length. The streamer 11 is provided with a drag body (not shown) at the end furthest from the multi-hull depressor to help to stabilise the streamer.

The depth of the streamer 11 is controlled by the multihull depressor 14 which is independently maneuverable. The adjustable depressor control surfaces include wings 15 as well as a balance-rudder and heading-rudder (not shown). The depressor is provided with a depth sensor, an altimeter, an attitude sensor and hydroacoustic positioning transponders.

After the depressor 14 has maneuvered the streamer 11 to a position close to the seafloor 18, the altitude keeper devices 16 maintain and make small adjustments to the height of the streamer 11 above the seafloor 18. There are ten independent altitude keepers 16 (eight not shown) spaced evenly along the streamer 11 to enable control of the streamer along its length. Each altitude keeper uses control surfaces 17 to maintain and make small adjustments to the streamer height.

The streamer steering control system is coordinated by the main control system 20 for the survey vessel 10, which receives inputs from the vessels' GPS system 21 and echo sounder system 22. The main control system 20 also receives inputs from the winch control system 23, the depressor control system 24 and the altitude keeper control systems 25, which in this embodiment communicate with the main control system via the depressor control system. The altitude keeper control systems 25 also communicate directly with each other to help maintain the depth of the streamer 11 as desired.

The winch control system 23, depressor control system 24 and altitude keeper control systems 25 are controlled by the main control system 20, to safely lower, tow and raise the streamer 11 and associated devices to perform a survey.

Figure 2:
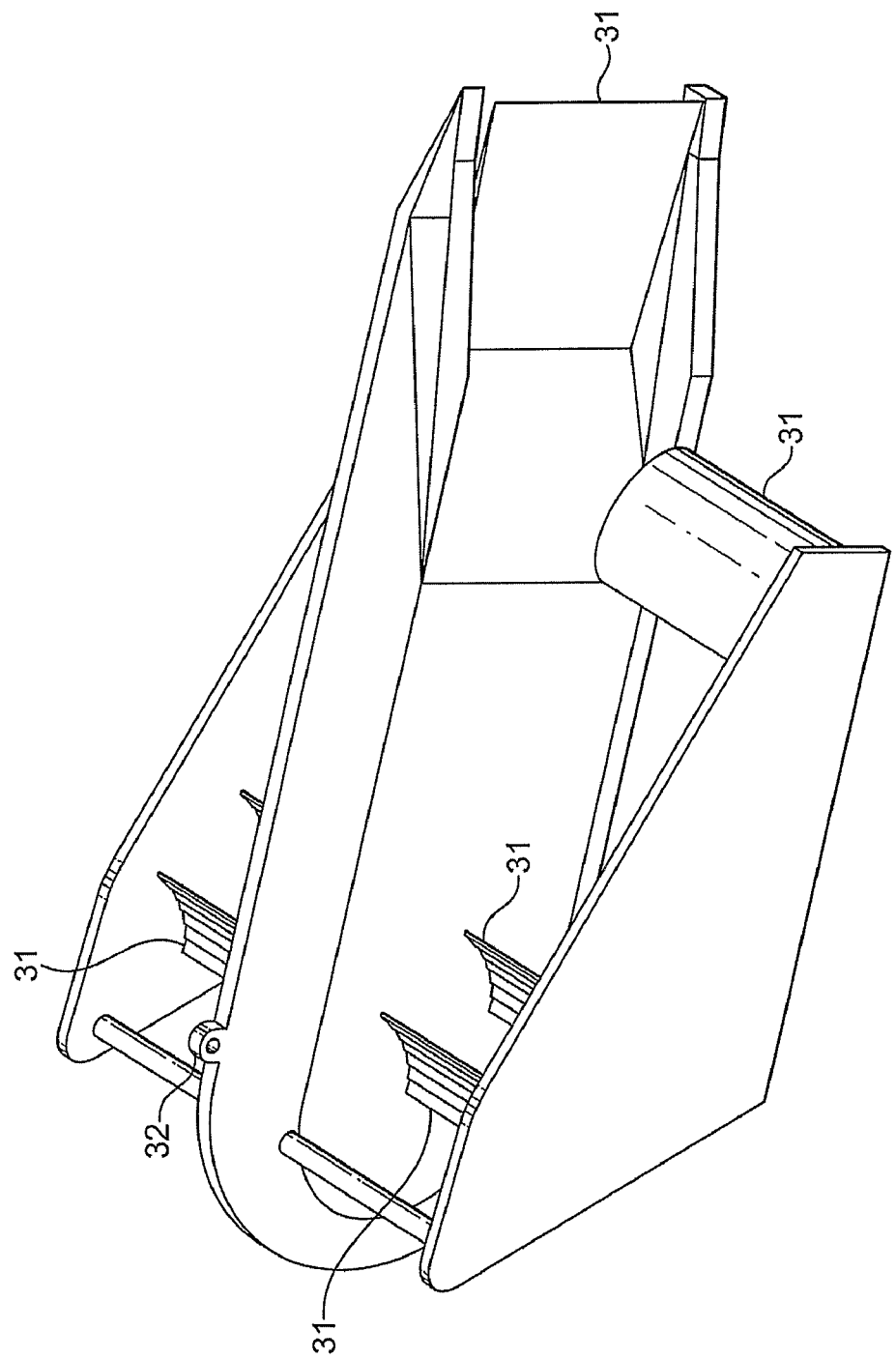
FIG. 2 is a view of an example of a depth controller.

FIG. 2 shows a depth controller suitable for use in a system according to an embodiment, in the form of a depressor. The depressor 30 is provided with control surfaces 31, to enable the position of the depressor in the water to be altered. The depressor has a tow point 32, from which it can be attached to the towing vessel, for example via tow line 13 of FIG. 1. The depressor is also provided with instrumentation as described previously and a control system (not shown).

Figure 3:
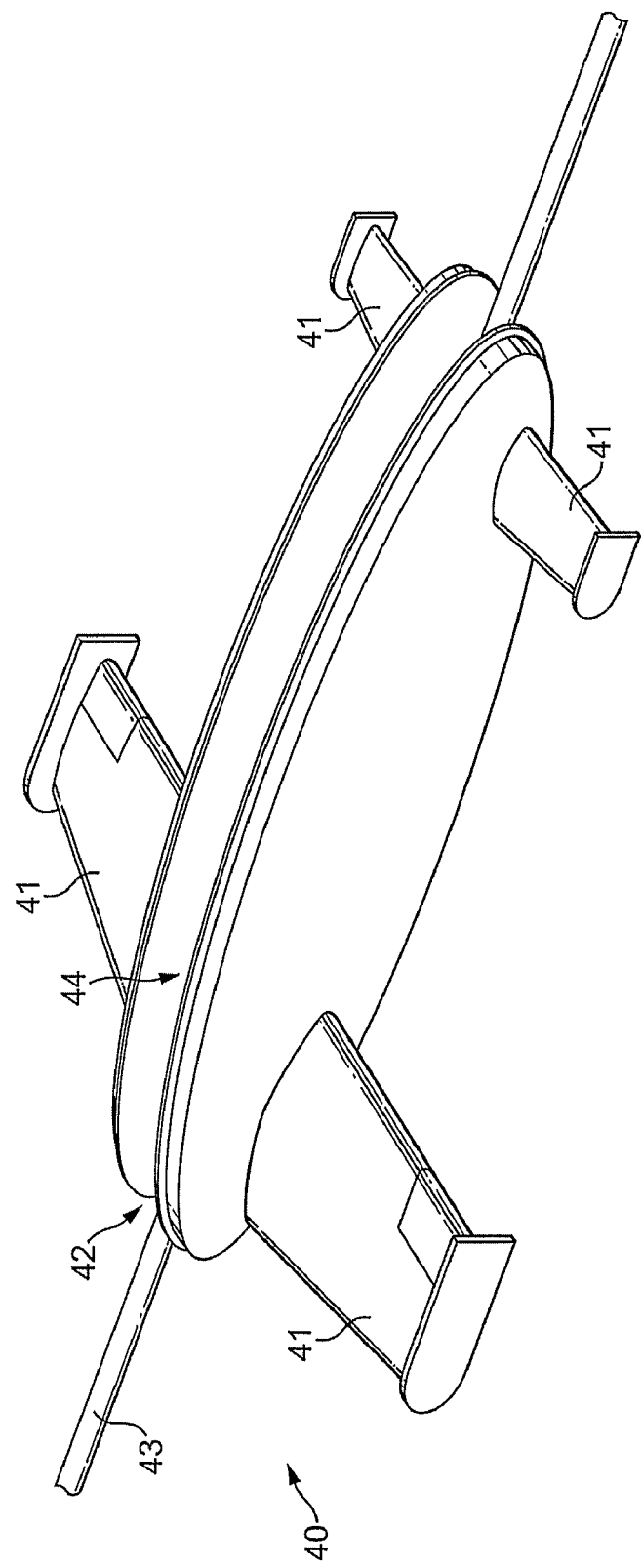
FIG. 3 is a view of an example of an altitude keeper.

FIG. 3 shows an altitude keeper suitable for use in a system according to an embodiment, which takes the form of a winged towfish. The towfish 40 comprises two approximately symmetrically-shaped parts which are provided with control surfaces 41. The two parts of the towfish 40 are separated by a gap 42 and are attached to each other only at attachment point 44, the approximate position of which is indicated. When the towfish is in use, the streamer 43 is accommodated in gap 42 and is attached to the towfish at attachment point 44. The towfish is also provided with appropriate instrumentation as referred to above, and a control system (not shown).

It will be appreciated that there are a number of alternative ways to run the control systems in order to control the depth of the subsea section of the survey system. The equipment required to maintain a streamer depth may also be varied, and can depend on the area being surveyed and the type of survey to be carried out. The detecting apparatus associated with each streamer will also depend on the type of survey to be carried out. A variety of sensor types may be used for reservoir characterisation, including magnetic sensors and instruments for the detection of P- and S-waves.

The invention claimed is:

1. An underwater survey system for use in seismic surveys comprising:
    a survey vessel;
    at least one streamer arranged to be towed by the vessel, the streamer adapted to be positioned sufficiently near the seafloor when in use to allow the measurement of both P- and S-waves,
    a detecting apparatus associated with each streamer,
    a streamer depth controller attached to said streamer and provided with at least two adjustable depth controller control surfaces which are respectively adjustable about two axes which are substantially perpendicular to each other so as to allow the depth controller to be actively controlled in both vertical and horizontal directions,
    at least one altitude keeper device attached to the streamer at a position behind said depth controller when the streamer is towed, said altitude keeper device comprising at least one adjustable altitude keeper control surface which is controllable to maintain the streamer at a desired altitude above the seafloor and
    a streamer steering control system.

2. An underwater survey system according to claim 1, wherein the depth controller is a depressor.

3. An underwater survey system according to claim 2, wherein a depth sensor, an altimeter, an attitude sensor and hydroacoustic positioning transponders are associated with the depth controller.

4. An underwater survey system according to claim 3, wherein the survey vessel is provided with a tow-winch, an overboard sheave system, a GPS system and a multibeam echo-sounder system.

5. An underwater survey system according to claim 1, wherein the system comprises a plurality of streamers.

6. An underwater survey system according to claim 1, wherein an altitude keeper device is located at an end of each streamer remote from the survey vessel and at a midpoint of each streamer.

7. An underwater survey system according to claim 1, further comprising a seismic source.

8. An underwater survey system according to claim 1, in which the streamer steering control system comprises subcontrol systems associated with each device in the survey system, a main control system located on the survey vessel adapted to coordinate the subcontrol systems and a multiplexer arranged to carry communications between underwater subcontrol systems and the main control system.

9. An underwater survey system according to claim 1, wherein the detecting apparatus includes one or more instruments selected from the group consisting of OBMs, hydrophones and geophones.

10. An underwater survey system according to claim 1, wherein the detecting apparatus comprises means for compensating for motion while detecting and recording data.

11. An underwater survey system according to claim 1, wherein said desired altitude is between 2 and 50 meters above the seafloor.

12. An underwater survey system according to claim 1, wherein said depth controller control surfaces include adjustable wings and at least one rudder.

13. An underwater survey system according to claim 1, wherein said altitude keeper device is in the form of a winged towfish.

14. An underwater survey system according to claim 13, wherein said winged towfish comprises two approximately symmetrically-shaped parts which are provided with said altitude keeper control surfaces.

15. An underwater survey system according to claim 1, wherein said altitude keeper device comprises at least two of said adjustable altitude keeper control surfaces, and wherein said adjustable altitude keeper control surfaces are adjustable about axes which are substantially parallel to each other.

16. An underwater survey system according to claim 15, wherein said adjustable altitude keeper devices comprises no adjustable altitude keeper control surfaces which are adjustable about axes which are not substantially parallel with each other.

17. An underwater survey system according to claim 1, wherein said altitude keeper device controls the altitude of the streamer but does not provide lateral control of the streamer.

18. A method of conducting an underwater survey comprising:
   towing at least one streamer behind a survey vessel, wherein a detecting apparatus, a streamer depth controller, an altitude keeper and a steering control system are associated with the streamer;
   maintaining the streamer at a position sufficiently near a seafloor to allow the measurement of both P- and S-waves using the streamer depth controller and the altitude keeper, as the streamer is towed by the vessel, the streamer depth controller having at least two adjustable depth controller control surfaces which are substantially perpendicular to each other so as to allow the depth controller to be actively controlled in both vertical and horizontal directions and the altitude keeper attached to the streamer at a position behind the depth controller when the streamer is towed, the altitude keeper comprising at least one adjustable altitude keeper control surface which is controllable to maintain the streamer at a desired altitude above the seafloor;
   controlling a direction of motion of the streamer using the steering control system; and
   detecting and recording data using the detecting apparatus while the streamer is in motion relative to the seafloor as the streamer is towed by the vessel.

19. A method of conducting an underwater survey according to claim 18, wherein said desired altitude is between 2 and 50 meters above the seafloor.

20. A method of conducting an underwater survey according to claim 18, wherein the streamer position is maintained at an approximately constant altitude above the seafloor.

21. A method of conducting an underwater survey according to claim 18, further comprising
   generating a seismic event using a seismic source; and
   detecting a response.

22. A method of conducting an underwater survey according to claim 18, further comprising using the data to prepare a survey report.

* * * * *